US 7,862,688 B2
Jan. 4, 2011

(12) United States Patent
Thomas (54) METHODS TO CONTROL ORGANIC CONTAMINANTS IN FIBERS

(75) Inventor: George S. Thomas, Collierville, TN (US)

(73) Assignee: Buckman Laboratories International, Inc., Memphis, TN (US)

(*) Notice: Subject to any disclaimer, the term of this patent is extended or adjusted under 35 U.S.C. 154(b) by 410 days.

(21) Appl. No.: 12/119,692

(22) Filed: May 13, 2008

(65) Prior Publication Data

US 2008/0283207 A1 Nov. 20, 2008

Related U.S. Application Data

(60) Provisional application No. 60/930,363, filed on May 16, 2007.

(51) Int. Cl.
*D21H 11/00* (2006.01)

(52) U.S. Cl. .................. 162/177; 162/199; 134/15

(58) Field of Classification Search .............. 162/177, 162/199
See application file for complete search history.

(56) References Cited

U.S. PATENT DOCUMENTS

| | | | |
|---|---|---|---|
| 4,698,133 A | 10/1987 | Moreland | |
| 5,074,961 A | 12/1991 | Dreisbach et al. | |
| 5,256,252 A | 10/1993 | Sarkar et al. | |
| 5,316,691 A | 5/1994 | Sone et al. | |
| 5,338,403 A | 8/1994 | Pedersen | |
| 5,356,800 A | 10/1994 | Jaquess | |
| 5,429,766 A | 7/1995 | Sone et al. | |
| 5,489,395 A | 2/1996 | Behler et al. | |
| 5,507,952 A | 4/1996 | Jaquess et al. | |
| 5,575,993 A | 11/1996 | Ward et al. | |
| 5,580,850 A | 12/1996 | Bigorra Llosas et al. | |
| 5,599,476 A | 2/1997 | Behler et al. | |
| 5,627,144 A | 5/1997 | Urfer et al. | |
| 5,658,875 A | 8/1997 | Giesen et al. | |
| 5,663,137 A | 9/1997 | Giesen et al. | |
| 5,681,862 A | 10/1997 | Hollis et al. | |
| 5,773,595 A | 6/1998 | Weuthen et al. | |
| 5,780,283 A | 7/1998 | Lee | |
| 5,789,372 A | 8/1998 | Fabry | |
| 5,798,331 A | 8/1998 | Anderson et al. | |
| 5,855,217 A | 1/1999 | John | |
| 5,952,279 A | 9/1999 | Fabry et al. | |
| 5,961,735 A * | 10/1999 | Heitmann et al. ............. 134/15 |
| 5,981,450 A | 11/1999 | Fabry et al. | |
| 6,013,616 A | 1/2000 | Fabry et al. | |
| 6,083,538 A | 7/2000 | Plijter et al. | |
| 6,358,522 B1 | 3/2002 | Hug et al. | |
| 6,471,826 B2 | 10/2002 | Glover et al. | |
| 6,605,452 B1 | 8/2003 | Basheer | |
| 6,607,749 B1 | 8/2003 | Daggy et al. | |
| 6,767,441 B1 | 7/2004 | Cai et al. | |
| 7,306,702 B2 * | 12/2007 | Pease et al. .................. 162/199 |
| 7,578,904 B2 * | 8/2009 | Pease et al. .................. 162/199 |
| 2003/0051836 A1 | 3/2003 | Borch et al. | |
| 2004/0194903 A1 * | 10/2004 | Pease et al. .................. 162/199 |
| 2004/0226672 A1 | 11/2004 | Borch et al. | |
| 2004/0231816 A1 | 11/2004 | Steeg et al. | |
| 2006/0110494 A1 | 5/2006 | Dusterhoft et al. | |
| 2008/0087393 A1 * | 4/2008 | Pease et al. .................... 162/72 |

FOREIGN PATENT DOCUMENTS

| | | |
|---|---|---|
| AT | 001 376 U1 | 4/1997 |
| DE | 43 20 453 A1 | 12/1994 |
| DE | 10 2005 034 413 A1 | 1/2007 |

OTHER PUBLICATIONS

AT 1376, Henkel, Apr. 1997, Machine translation.*
DE 102005034413, Jan. 2007, BASF, Machine translation.*
International Search Report and Written Opinion of the International Searching Authority from counterpart International Patent Application No. PCT/US2008/063515 dated Sep. 1, 2008 (14 pages).

* cited by examiner

*Primary Examiner*—Mark Halpern
(74) *Attorney, Agent, or Firm*—Kilyk & Bowersox, P.L.L.C.

(57) ABSTRACT

Methods to control organic contaminants in fibers are described. One method involves contacting the fibers with a composition containing water-soluble cellulose derivative and ester hydrolyzing enzyme, for a sufficient time and in a sufficient amount to control the organic contaminants present in the fibers. This method is effective to reduce stickies in paper mill furnish formed with recycled fibers. A method for pitch control in paper mill furnish formed with virgin fibers is also provided by the additional inclusion of lipoxygenase in the composition. Resulting paper products formed from the processed fibers are also described as well as methods to make them.

26 Claims, 2 Drawing Sheets

METHODS TO CONTROL ORGANIC CONTAMINANTS IN FIBERS

This application claims the benefit under 35 U.S.C. §119(e) of prior U.S. Provisional Patent Application No. 60/930,363, filed May 16, 2007, which is incorporated in its entirety by reference herein.

BACKGROUND OF THE INVENTION

The present invention relates to papermaking processes and more particularly relates to controlling the organic contaminants present in certain types of fibers used to make paper or similar types of fiber containing products.

Organic contaminants are present in paper pulp that tends to deposit on processing surfaces and equipment, causing maintenance problems and production inefficiencies. Organic contaminants of significant concern in this regard include "stickies" and pitch, with the former generally associated with recycled pulp sources while the latter with virgin pulp supplies.

Conventional recycling of old paper products such as old newsprint, old corrugated containers, and mixed office waste is an important aspect of paper mills today due to environmental demands that many paper containing products have a portion of recycled fibers contained within the paper product. Thus, paper mills are in a situation where the recycling of paper products is a necessity. However, the recycling of the paper products generally requires additional processing steps in order to lead to fibers which can be useable in paper products.

Conventional recycling of old newspapers to obtain fibers comparable to the type of fibers used to originally make the newsprint is known in the art as "de-inking," and typically involves pulping, washing, usually with surfactants, screening, solubilizing insoluble contaminants usually by strong caustic treatments, washing, and bleaching of the fibers to counteract the yellowing effects of caustic treatments.

Generally, the first step in conventional recycling is to separate the paper into individual fibers with water to form a pulp slurry followed by removing ink and contaminants from the fibers by a combination of various process steps, such as screening, centrifugal cleaning, washing, flotation, and the like. The screening and centrifugal cleaning step removes large contaminants, such as paperclips, staples, plastics, and the like. The primary purpose of washing and flotation steps is to solubilize and/or suspend contaminants in the water and to remove the contaminants from the water. Surfactants and caustic agents are added to facilitate the solubilization and separation of contaminants from the fibers. Once caustic agents are used, some yellowing of the fibers can occur which may result in a need to bleach the fibers. The fibers are blended with, typically, virgin fibers and then used in the paper making process for which the fiber properties are suitable. Recent developments in waste paper de-inking make use of enzymes to aid in the detachment and removal of inks from the fibers. These processes describe the use of particular types of enzymes to facilitate ink removal without the negative effects of caustic treatment on brightness along with the use of flotation to remove the agglomerated ink particles.

In the past, chemical additives such as caustic agents have been added to remove organic contaminants, known as "stickies." Stickies are generally adhesives, glues, hot melts, coatings, coating binders, ink residues, de-inking chemicals, wood resins, rosin, and unpulped wet strength resins that typically are present with the fiber to be recycled. These organic contaminants typically must be removed in substantial quantities so that they do not affect the subsequent processing steps. There is always a desire in the paper making industry to develop new methods to remove such organic contaminants in more effective and environmentally friendly ways.

"Stickies" can be generally described as tacky, hydrophobic, pliable organic materials found in recycled paper systems. Stickies have a broad range of melting points and different degrees of tackiness dependent upon the composition of the stickies. Temperature, pH, concentration, size, and composition can affect the tackiness of stickies. The variable nature of stickies is one of the reasons that controlling or removing them can be difficult and unpredictable. Also, the use of recycled fiber has been increasing and is expected to continue growing, making stickies a more significant problem.

Recycled paper fibers contain many components that when repulped in recycle fiber plants become stickies. Recycled furnishes may have as many as a dozen different types of stickies, each having its own characteristics. Sources of stickies may include any of the following: adhesives, hot melts, coating binders, ink residues, deinking chemicals, wood resins, rosin, pitch, and wet strength resins. The actual tacky deposits found on paper machines may be a combination of several of these organic contaminants as well as inorganic particles such as talc, clay, or calcium carbonate.

Stickies deposit on machine surfaces, fabrics, wires, felts, rolls and dryers and lead to problems such as wet end breaks, pressroom breaks, dryer section breaks, holes, sheet defects, and high dirt counts. These deposits and associated problems lead to a significant amount of downtime yearly. The cost of stickies has been estimated at over 500 million dollars annually in the U.S., when considering the cost of downtime, chemical costs, production losses, rejected materials, and customer complaints.

There are typically two main methods of removing stickies, mechanical and chemical. Mechanical methods include screening, cleaning, washing, floating, and dispersing, with each method designed to remove a different size contaminant. Screening typically removes larger or macro stickies (>0.004 inch or 100 microns). Forward and reverse cleaners can be used. Based on density differences using centrifugal force, forward cleaners remove contaminants heavier than water and reverse cleaners remove particles lighter than water. This method removes more macro stickies than micro stickies. Floating removes intermediate size stickies (50-300 microns), which are troublesome, because they are small enough to be accepted by screening and cleaning but too large to be removed by washing. In disperging, the stock is thickened, passed through a device at high temperature, pressure, and shear, which breaks organic contaminants, including stickies, into smaller pieces.

Various chemical methods can be used. For instance, in pacification, additives like talc, clay, nonionic organic polymers, and other inorganic particles are used to render the stickies less tacky. In dispersion, dispersants, surfactants, and solvents are used to make stickies smaller.

In fixation, the stickies are attached to the paper sheet by using a cationic water soluble polymer, which adds charge to the stickies. In disperse and fix, a dispersant is added first to reduce the size of the stickies and then a cationic polymer is used to fix the stickies onto the sheet. With passivation, the use of dispersants, solvents, and low molecular weight cationic polymers makes the paper machine less susceptible to stickies.

The favored approach to remove stickies is to keep the stickies large in the stock prep area, so that the mechanical cleaning equipment can remove as many "stickies" as possible. Then, all remaining stickies should be dispersed either mechanically or chemically and fixed to the fiber, so that they can be sent out with the sheet.

Once as many stickies as possible are removed mechanically, the rest have in the past been dispersed mechanically, chemically, or by using a combination of the two. Once dispersed, polymer addition to stabilize these particles in their smallest state has been used, so that the particles will be retained on the sheet.

Measuring and controlling stickies in a recycled paper manufacturing process has always been a challenge. Variations in recycled paper quality and the trend to increase the amount of waste paper incorporated into each ton of pulp produced are each contributing factors that make this challenge even more difficult to address. (Pulp and Paper Fact Book, 2000). These variations make predicting the amount of stickies that are entering a mill's system troublesome. Once these stickies are in the system, the larger contaminants, or macrostickies, are often removed mechanically. However, additional stresses on the screens and cleaner banks such as high furnish consistency, improper in-screen dilution, improper reject rates, and differential pressure control problems will facilitate the acceptance of formed macrostickies (Gallagher, 1997). Macrostickies are defined as stickies that are retained on a 0.10 mm screen plate (Heise, 1998). These contaminants which come from adhesives, coatings, binders, and other materials are incorporated into the furnish during the pulping process, and will deposit on forming fabrics, press felts, dryer fabrics, press section rolls, Uhle boxes, and calendar stacks (Douck, 1997). These materials remain tacky in the paper making process, leading to the "stickies" label (Doshi, 1997). Once the materials are incorporated into the furnish, they are difficult to remove, since they are deformable in nature and are often close to the specific gravity of water. These physical characteristics present a different screening and cleaning challenge as these contaminants slip through screens and cleaners (Scholz, 1997) that are designed to allow water and fiber to be accepted. The consequence of this fact is the acceptance of macrostickies into the post screening process.

Even if the cleaning and screening systems do perform properly and do remove most of the macrostickies, the remaining microstickies may cause problems. The agglomeration of microstickies, stickies not retained on a 0.1 mm screen, can lead to the formation of macrostickies which will then deposit onto the machine and onto fabric surfaces (Doshi, 1997). Microstickies are not problematic as long as they remain small. However, they often agglomerate in the paper making process leading to macrostickies formation The cost of stickies deposition is a significant one. One source estimates the cost of the stickies problem to the industry in terms of machine downtime to be over $500 million annually for major recycled paper grades (Friberg, 1997). Once macrostickies are present in the furnish after the screening and cleaning systems, mechanical means of removing stickies have been exhausted. Preventing the agglomeration of microstickies is also an issue in addition to the microstickies problem. In order to address each of these problems, a chemical control solution is often required.

U.S. Pat. No. 6,471,826 B2 describes the use of a composition comprising at least one esterase or lipase to reduce the concentration of stickies in pulp and paper mill systems. U.S. Pat. No. 4,698,133 describes the use of water-soluble cellulose derivatives to inhibit the deposition of stickies on paper mill process equipment.

Pitch deposition on process equipment in paper making systems using virgin pulp supplies also can result in operational problems and production inefficiencies. Pitch is a naturally occurring matter in wood pulp. Pitch can deposit, for instance, on screens used in the process line to reduce their throughput, and/or on process control devices, rendering them inoperable, such as instrument probes. Deposition of the pitch can occur not only on metal surfaces in the system, but also on plastic and synthetic surfaces such as machining wires, felts, foils, uhle boxes and headbox components. Pitch deposits may also break off resulting in spots and defects in the final paper product which decrease the quality of the paper. Surfactants, anionic polymers and copolymers of anionic monomers and hydrophobic monomers have been used extensively to prevent pitch deposition of metal soap and other resinous pitch components. U.S. Pat. No. 5,074,961 describes the use of methylcellulose derivatives to inhibit the deposition of pitch on paper mill process equipment.

SUMMARY OF THE INVENTION

A feature of the present invention is to provide methods to control organic contaminants present in fibers that contain organic contaminants. A further feature of the present invention is to provide a method to process recycled and/or virgin pulp fibers in a manner such that the organic contaminants present in the recycled and/or virgin pulp fibers are controlled.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages and in accordance with the purposes of the present invention, as embodied and broadly described herein, the present invention relates to a method to control organic contaminants present in fibers containing organic contaminants. The method involves contacting fibers with a composition comprising at least one type of water-soluble cellulose derivative and at least one type of ester hydrolyzing enzyme for a sufficient time and in a sufficient amount to control organic contaminants present in the fibers.

In a particular embodiment, a method involves contacting recycled fibers with a composition comprising at least one water-soluble cellulose derivative and at least one ester hydrolyzing enzyme for a sufficient time and in a sufficient amount to control stickies present in the recycled fibers. In a more particular embodiment, the combination of a water-soluble cellulose derivative and an ester hydrolyzing enzyme, such as lipase, yields synergistic reductions in stickie amounts from recycled fibers as compared to the use of either agent alone.

Amongst other benefits and advantages, the combination of a water-soluble cellulose derivative and ester hydrolyzing enzyme gives improved control of stickies, which is greater than the level of control provided by either enzymes or water-soluble cellulose alone. The method is effective to reduce stickies in paper mill furnishes, e.g., which utilize old newspapers, old corrugated containers, and mixed office waste, and the like.

In another particular embodiment, a method involves contacting virgin fibers with a composition comprising at least one type of water-soluble cellulose derivative, at least one type of ester hydrolyzing enzyme, and optionally at least one type of lipoxygenase, for a sufficient time and in a sufficient amount to control the pitch present in the virgin fibers.

The benefits of the methods of the present invention include, for example, reduced downtime, increased machine runnability, reduced furnish cost, improved converting efficiency, increased brightness, improved effective residual ink concentration, improved sheet quality, and/or reduced solvent usage. The methods can be cost effective as compared to conventional stickies or pitch control programs.

It is to be understood that both the foregoing general description and the following detailed description are exemplary and explanatory only and are only intended to provide a further explanation of the present invention, as claimed. The accompanying drawings, which are incorporated in and constitute a part of this application, illustrate several embodiments of the present invention and together with the written description, serve to explain the principles of the present invention.

BRIEF DESCRIPTION OF THE DRAWINGS

In each figure, comparisons are made with comparison samples containing only one of the water-soluble cellulose or ester hydrolyzing enzyme, and a control containing neither one, and one sample in which the components were added separately to the treated paper stock, but otherwise the comparison, control and inventive samples were the same for comparison purposes.

DETAILED DESCRIPTION OF THE PRESENT INVENTION

The present invention relates to methods to control organic contaminants present in fiber containing organic contaminants by treating fibers with a composition including water-soluble cellulose derivatives and ester hydrolyzing enzymes, and optionally also lipoxygenase. The fiber can be cellulose fibers, such as recycled fibers, virgin wood cellulose fibers, or combinations thereof.

Processing of Recycled Fibers. In one embodiment, a method is provided for contacting fibers, e.g., recycled fibers, with a combination of water-soluble cellulose derivative(s) and ester hydrolyzing enzyme(s), which has been found to provide improved stickies control. The stickies control achieved is greater than the level of control provided by the enzyme or water-soluble cellulose derivative alone. Synergistic levels of stickies reduction may be achieved where the composition combines at least one water-soluble cellulose derivative with at least one ester hydrolyzing enzyme, such as a lipase. The method reduces the amount of stickies in paper mill furnish and/or detackifies the remaining stickies so the deposition of the remaining stickies is inhibited.

The recycled fibers may be obtained from a variety of paper products or fiber containing products, such as paperboard, newsprint, sanitary and other paper products. These products may comprise, for example, old corrugated containers (OCC), old newsprint (ONP), mixed office waste (MOW), or combinations thereof. These types of paper containing products typically contain large amounts of organic contaminants which are present in the paper products. When these types of paper products are recycled, these organic contaminants are present along with the fibers formed during the pulping stage of a paper making process. These organic contaminants, if not substantially removed, can severely interfere with subsequent stages in the paper making process by affecting the quality of the resulting sheets of paper formed and/or effecting the machinery used to form the paper. Accordingly, the removal of such organic contaminants is important to the paper making process when such organic contaminants are present in fibers.

For purposes of the present invention, examples of organic contaminants include what is known in the industry as "stickies" and include, but are not limited to, synthetic polymers resulting from adhesives and the like, glues, hot melts, coatings, coating binders, ink residues, de-inking chemicals, wood resins, rosin, pressure sensitive binders and unpulped wet strength resins. These type of materials are typically found in paper containing products, such as newsprint, corrugated container, and/or mixed office waste. These organic contaminants can have polymers present, such as styrene butadiene rubber, vinyl acrylates, polyisoprene, polybutadiene, natural rubber, ethyl vinyl acetates, polyvinyl acetates, ethylvinyl alcohols, polyvinyl alcohols, styrene acrylates, and/or other synthetic type polymers.

In one process of the present invention, these organic contaminants are controlled by contacting the fiber containing the organic contaminants with a composition containing at least one water-soluble cellulose derivative and at least one ester hydrolyzing enzyme for a sufficient time and in a sufficient amount to control the organic contaminants present in the fiber. The compositions of the present invention can disperse or convert the organic contaminants to organic species that do not affect the paper making process. For instance, the polyvinyl acetates can be dispersed and/or converted to polyvinyl alcohols, which do not affect the paper making process. This manner that the compositions achieve control of organic contaminants is quite different from collecting contaminants by flotation.

Water-soluble Cellulose Derivatives. The methods of the present invention use derivatives of cellulose as one of the co-ingredients of the active composition. The materials that are effective for this application are water soluble derivatives of cellulose. Lower and higher alkyl (e.g., $C_2$, $C_3$, $C_4$, $C_5$, $C_6$, $C_7$, $C_8$, $C_9$, or $C_{10}$ and higher) ether derivatives of cellulose and/or alkyl linkages other than ethers can be used so long as they are water soluble. Water-soluble derivatives of cellulose are commercially available, e.g., as methyl cellulose, hydroxyethyl methyl cellulose, hydroxypropyl methyl cellulose, cetyl hydroxyethylcellulose and hydroxybutyl methyl cellulose. Non-substituted or substituted forms of these celluloses may be used.

Methyl ether derivatives (or alkyl ether derivatives) of cellulose can be made by reacting cellulose with the appropriate reagent in the presence of caustic soda. Methyl cellulose can be made using methyl chloride, hydroxyethyl methyl cellulose can be made using ethylene oxide and methyl chloride, hydroxypropyl methyl cellulose can be made using propylene oxide and methyl chloride and hydroxybutyl methyl cellulose can be made using butylene oxide and methyl chloride. Among these three types, there are variations in molecular weight ranging from about 10,000 to about 246,000 which corresponds to a degree of polymerization of from about 53 to about 1,280 anhydroglucoside units. The number of substitution groups on the anhydroglucoside units of the cellulose polymer can affect the solubility properties, but all levels of substitution that are water soluble are part of this invention. The cellulose derivatives may contain methyl ether substitution, or hydroxyl ethyl ether substitution, or hydroxyl propyl methyl ether substitution or hydroxyl butyl ether substitution or cetyl hydroxylethyl or other groups may be added that do not affect the efficacy of the cellulose derivative for this purpose. Commercially available water-soluble celluloses that can be used in compositions of the present invention include Methocel products, such as Methocel F50, which is hydroxypropylmethylcellulose, Methocel F15AV, which is methyl cellulose, and Cellosize QP-1500-H hydroxyethyl cellulose, which is hydroxyethyl methyl cellulose, all available from Dow Chemical Co., Midland Mich. and Natrosol 330 Plus which is cetyl hydroxyethylcellulose, available from Hercules Inc., Wilmington, Del., and is described in U.S. Published Patent Application No. 2004/0231816. The water-soluble cellulose derivatives as encompassed by the present invention are generally nonionic in nature and the alkyl group of the alkyl ether moiety can be unsubstituted or substituted. Preferred amounts of the water-soluble cellulose derivatives are from about 0.002 lbs. to about 2 lbs. per ton of dry fiber treated, and more preferably from about 0.004 to about 1 lb. per ton of dry fiber treated, and most preferably from about 0.01 to about 0.4 lbs. per ton of dry fiber treated. Alkyl ether celluloses can be made in the same manner. More than one type of methyl (or alkyl) ether cellulose derivative can be used, such as two, three, or four types. The methyl (or alkyl) ether cellulose derivatives can be pre-combined beforehand or added separately or introduced in any order in forming the composition and/or introducing the composition (or components thereof) in the papermaking process.

Ester Hydrolyzing Enzymes. The composition containing the water-soluble cellulose derivative and ester hydrolyzing enzyme preferably contains a high concentration of ester hydrolyzing enzymes. Esterase, lipase, and cutinase are non-limiting examples of ester hydrolyzing enzymes that may be used singly or in any combinations thereof in the methods of the present invention. Esterases are enzymes that cleave triglycerides (viz., fats or lipids) or esters into carboxylic acids (fatty acids) and mono- and di-glycerides. Lipases are hydrolytic enzymes that act upon the ester bond of neutral lipids and phospholipids. Lipases hydrolyze triglycerides, or fats, to glycerol and fatty acids. Cutinases are hydrolytic enzymes that degrade cutin, the cuticular polymer of higher plants, which is a polyester composed of hydroxy and epoxy fatty acids. Fatty acids of cutin are usually n-$C_{16}$ and n-$C_{18}$ and contain one to three hydroxyl groups.

Lipase can be derived or isolated from pancreatic sources (e.g., pancreatic lipase) or from various fungi and/or bacteria, and/or other microorganisms. Examples include, but are not limited to, triacylglycerol acylhydrolase and triacyl glycerol lipase. Also, any lipase or esterase capable of hydrolyzing triglycerides to glycerol and fatty acids can be used. Commercially available products containing esterase or lipase can be used. For instance, Optimyze®, Busperse® 2528, Buzyme® 2515 and Buzyme® 2517 can be used which are products available from Buckman Laboratories International, Inc. These products can combine the lipase or esterase enzyme with solvents and surfactant for stability. Products containing such enzymes as Resinase HT, Resinase A2X, Novocor ADL, Pancreatic Lipase 250, Lipase G-1000, Greasex 50 L, and Greasex 100 L products can be used in the methods of the present invention. Such products are available from such commercial sources as Genencor, Novo Nordisk, and Novozymes, Inc. Esterase sources are available as products designated as NS51032 or NS51060, which are commercially made by Novozymes Inc. The esterase or lipase described in U.S. Pat. Nos. 5,507,952 and 5,356,800 and in U.S. Patent Application Publication No. 2003/0051836 and 2004/0226672 can be used in the present invention and these patents are incorporated in their entirety along with any other patent publications mentioned in this application, by reference herein. A lipolytic enzyme can be used in the present invention. The ester hydrolyzing enzymes can generally be used in any form, such as liquid form or solid form. Preferably, the amount of ester hydrolyzing enzyme used in the methods of the present invention are a sufficient amount to control the organic contaminants present in the fiber. The enzyme used in the present invention can have any amount of activity. For instance, the activity can be at least 5.0 LU/Gm/min, such as at least 10 LU/Gm/min, or at least 15 LU/Gm/min, for instance from 15.0 to 30.0 LU/Gm/min defined as lipase units per gram per minute (LU/gm/min). The lipases used in the present invention can have this activity, for instance, the triacylglycerol lipase and other lipases. For instance, Resinase A2X lipase from Novozyme has activity of about 15.0 to 20.0 LU/Gm/min defined as lipase units per gram per minute (LU/gm/min). As another example, a cutinase can be evaluated based on its vinyl acetate esterase activity for de-esterifying polyvinylacetate. Therefore, the cutinase can be assayed as its ability to liberate or produce millimoles of acetic acid per gram per minute. This activity can be equal to at least 10 mmol/gm/min, or at least 15 mmol/gm/min, or at least 20 mmol/gm/min of liberated acetic acid. For example, Optimyze activity can be equal to 21.0 to 23.0 mmol/gm/min of liberated acetic acid. Preferred (total) amounts of ester hydrolyzing enzyme are from about 0.005 lbs. to about 4 lbs. per ton of dry fiber treated, and more preferably from about 0.01 to about 2 lbs. per ton of dry fiber treated, and most preferably from about 0.05 to about 0.5 lbs. per ton of dry fiber treated. More than one enzyme can be used, such as two, three, four, or more. The one or multiple enzymes can be added as part of a pre-mixture, added separately, or added in any order in forming the composition or in introducing the composition (or components thereof) to the papermaking process.

The ester hydrolyzing enzyme may be stabilized esterase and/or lipase compositions using the formulations described in U.S. Pat. Nos. 5,356,800 and 5,780,283, incorporated in their entirety by reference herein. At least one polymer can be added together with the composition containing the water-soluble cellulose derivative and ester hydrolyzing enzyme at about the same time. Alternatively or additionally, one or more polymers can be added before or after the introduction of the enzyme(s). For instance, the polymer(s) can be added one hour or less before or after introduction of the enzyme(s) to the fiber. The polymer can be a water soluble polymer, such as a cationic water soluble polymer. Examples of such polymers include, but are not limited to, epichlorohydrin/dimethylamine polymers (EPI-DMA) and cross-linked solutions thereof, polydiallyl dimethyl ammonium chloride (DADMAC), DADMAC/acrylamide copolymers, ionene polymers, and the like. Examples of ionene polymers include, but are not limited to, those set forth in U.S. Pat. Nos. 5,681,862 and 5,575,993, both incorporated in their entireties by reference herein. Further, the polymers set forth in U.S. Pat. No. 5,256,252 can be used as well and this patent is incorporated in its entirety by reference herein. The polymer if used in the methods of the present invention can be used in any amount and preferably in dosage ranges of from about 0.1 to about 15 pounds per ton of dry fiber treated, more preferably from about 0.25 pounds to about 10 pounds per ton of dry fiber treated, and more preferably from about 1 pound to about 5 pounds per ton of dry fiber treated.

For purposes of the present invention, controlling organic contaminants present in fibers having organic contaminants is understood as one or more of the following: reducing the size of contaminant particles, reducing the number or amount of measurable particles present, and/or reducing the tackiness of the organic contaminants. Preferably, when controlling organic contaminants using the methods of the present invention, all of these reductions occur. Preferably, the reduction of the size of contaminant particles is by at least about 5%, more preferably by from about 10% to about 75% as compared to when no ester hydrolyzing enzyme and water-soluble cellulose derivative are present. Similarly, the reduction in the number or amount of organic contaminants present in the fiber is reduced by at least about 5%, and more preferably by from about 10% to about 75% when compared to fibers which have not been treated with the composition combining water-soluble cellulose derivatives and ester hydrolyzing enzyme. Also, the reduction of tackiness of the organic contaminants is preferably reduced by at least about 5%, and more preferably by from about 10% to about 75% when compared to fibers which have not been treated with the composition.

The compositions containing water-soluble cellulose derivative and ester hydrolyzing enzyme can also contain as an option other conventional paper treatment chemicals or ingredients such as, but not limited to, one or more surfactants, solvents, suspension aids, fillers, chelants, preservatives, buffers, water, and/or stabilizers, and the like. These additional ingredients can be present in conventional amounts.

In the methods of this present invention, the water-soluble cellulose derivative and ester hydrolyzing enzyme-containing compositions can be introduced at any point in the processing of the fiber containing organic contaminants as part of a paper making process. Generally, the composition containing the water-soluble cellulose derivative and ester hydrolyzing enzyme is introduced or brought into contact with the fiber containing the organic contaminants in any fashion. For instance, if the fiber containing the organic contaminants originates from products to be recycled, the water-soluble cellulose derivative and ester hydrolyzing enzyme containing compositions can be introduced prior to the pulping stage, during the pulping stage, and/or after the pulping stage. If the water-soluble cellulose derivative and ester hydrolyzing enzyme-containing compositions are introduced prior to the pulping stage, typically, the composition will be introduced such as by spraying or other means, onto the paper containing product which are going to be introduced into the pulper. Also, or alternatively, the water-soluble cellulose derivative and ester hydrolyzing enzyme-containing compositions can be present or introduced into the pulper during the pulping stage which can be by any conventional pulping technique such as mechanical pulping, full chemical pulping, or combinations thereof. The water-soluble cellulose derivative and ester hydrolyzing enzyme-containing compositions can be introduced during the stock preparation stage of the paper making process. Preferably, the contact time of the water-soluble cellulose derivative and ester hydrolyzing-containing composition with the fibers containing organic contaminants should be maximized. The enzyme-containing compositions generally are used in a manner providing sufficient reaction time, minimal concentration of oxidizers, and a suitable pH and temperature ranges. These considerations generally apply to the enzymes. There is no need to denature the enzymes. The optimum pH for enzyme activity may vary for different enzymes. In general, the water-soluble cellulose derivative and ester hydrolyzing enzyme-containing composition is generally effective over a pH range of about 6.8 to about 9.5, and a temperature range of between about 4 and about 65° C. Preferably, the contact time should be sufficient to control the organic contaminants present with the fibers such that organic contaminants are substantially controlled. Preferably, the contact time is from about 1 min. to about 8 hours, more preferably from about 10 min. to about 4 hours, and most preferably from about 20 min. to about 2 hours.

The water-soluble cellulose derivative and ester hydrolyzing enzyme-containing compositions can be introduced or brought into contact with the fiber containing organic contaminants at the thick stock storage stage and/or prior to the flotation de-inking stage. Preferably, the water-soluble cellulose derivative and ester hydrolyzing enzyme-containing compositions are introduced after the flotation stage in the paper making process. More preferably, the water-soluble cellulose derivative and ester hydrolyzing enzyme-containing compositions are introduced after the flotation stage and before the paper machine headbox. In some paper making processes, there is no flotation step, such as with the recycling of OCC. Thus, the water-soluble cellulose derivative and ester hydrolyzing enzyme-containing compositions are preferably added at or after the pulper and/or at or before the headbox. The compositions can also be added in the paper machine white water.

The manner in which the water-soluble cellulose derivative and ester hydrolyzing enzyme-containing composition is introduced or brought into contact with the fiber containing the organic contaminants can be in any fashion, such as by injection points, pouring the water-soluble cellulose derivative and ester hydrolyzing enzyme-containing compositions into the area to be treated, and/or using repulpable bags of dry or liquid enzymes. The introduction of the water-soluble cellulose derivative and ester hydrolyzing enzyme-containing composition can be immediate, slow release, timed release, intermittent, and/or continuous.

In the methods of the present invention, the water-soluble cellulose derivative and ester hydrolyzing enzyme-containing compositions can be introduced at multiple points or at just one point of the paper making operation. In addition, more than one type of water-soluble cellulose derivative and ester hydrolyzing enzyme-containing compositions can be used, mixtures can be used, or any other variations as long as at least one water-soluble cellulose derivative and ester hydrolyzing enzyme-containing is introduced in some fashion in order to control organic contaminants present in fibers having organic contaminants. The composition (or mixture) can be pre-formed prior to introducing to the papermaking operation, or the individual components of the composition can be added separately or can be pre-combined and added to a feed line, or can be added in any order or combination. The addition can be by batch, continuously, semi-continuously, or any combination thereof. The composition may or may not be diluted with fresh water or process water.

In the methods of the present invention, the controlling of the organic contaminants present in fibers having organic contaminants can be incorporated into any paper making operation. Typically, the remaining aspects of the paper making operation as is known to those skilled in the art can be used in order to form paper products. Thus, the conventional additive materials used with paper making pulps during stock preparation can be used as well in the present invention. Continuous or non-continuous paper making machines can then convert aqueous suspensions of fibers and other ingredients into dry sheets of paper using such conventionally known operations which involve Fourdrinier machines, twin wire machines or cylinder machines or other paper making devices. Subsequent treatments of the sheets of paper to achieve the desired characteristics such as machine calendering and/or coating of the papersheets and the like can also be used in the present invention.

Although not desiring to be bound by theory, it is believed that the combined water-soluble cellulose derivate and ester hydrolyzing compositions used in methods of the present invention reduce and/or inhibit stickies problems by at least one or more of the following mechanisms or effects, including aiding in separating them from the wastepaper; removing them from the fiber and the de-inking process; preventing agglomeration of residual stickies in the pulp; preventing deposition on the fabric, felt and dryer; and/or retaining microscopic stickies in the sheet at a size too small to cause manufacturing or converting problems.

Processing of Virgin Fibers. In another embodiment, a method is provided for contacting fibers, particularly virgin fibers, with a combination of water-soluble cellulose derivatives, ester hydrolyzing enzymes, and optionally lipoxygenase, which has been found to improve control of pitch. The pitch control achieved is greater than the level of control provided by the enzymes and/or water-soluble cellulose derivative alone. Ester hydrolyzing enzymes, such as lipase, can be used to reduce the concentration of fatty esters in pulp and paper mill systems. Fatty esters are quite prone to deposit in pulp and paper mills and it is expected that by reducing the fatty ester content, that reduced deposition will be seen. However, this has not proven to be the case. Fatty acids which are the reaction product of the action of the enzyme with fatty esters often deposit, which will cause the mill to have operational and quality problems. The combination of ester hydrolyzing, and optionally lipoxygenase enzymes, and water-soluble cellulose derivatives unexpectedly provides improved pitch control over either compound by itself for a given total amount of use. These combinations of enzymes and water-soluble cellulose derivatives reduce the amount of pitch in the paper mill furnish and also detackifies the remaining pitch so the deposition of the remaining pitch is inhibited. The utility of the treatment process is not believed dependent upon whether the pulp is derived from softwood, hardwood or blends thereof. For purposes of this application, virgin fiber refers to cellulosic fiber other than recycled fiber, and can include bleached or unbleached Kraft, sulfite pulp or other chemical pulps, and groundwood (GW) or other mechanical pulps such as, for example, thermomechanical pulp (TMP).

Lipoxygenases. Lipoxygenases are iron-containing enzymes that catalyze the dioxygenation of polyunsaturated fatty acids to form fatty acid hydroperoxides. Lipoxygenases are found in plants and animals. Preferred amounts of the lipoxygenase are from about 0.004 lbs. to about 4 lbs. per ton of dry fiber treated, and more preferably from about 0.01 to about 2 lbs. per ton of dry fiber treated, and most preferably from about 0.05 to about 0.5 lbs. per ton of dry fiber treated. The water-soluble cellulose and ester hydrolyzing enzymes may be used in this composition that further includes lipoxygenase in respective range amounts that are similar to those described above for the composition preferably used in treating recycled fiber. More than one lipoxygenase can be used, such as two, three, or four or more. The lipoxygenase can be pre-combined with the water-soluble cellulose derivative and/or the ester hydrolyzing enzyme, or can be added separately to a feed stream or to the pulp stream or elsewhere.

The ester hydrolyzing enzymes, and optional lipoxygenase enzymes, and water-soluble cellulose derivative-containing compositions of this embodiment of the present invention are effective in controlling pitch deposition in paper making systems, such as Kraft, acid sulfite, groundwood and other mechanical pulp paper making systems. For example, pitch deposition in the brown stock washer, screen room and decker systems in Kraft paper making processes can be controlled. The term "paper making system" is meant to include all pulp processes. Generally, it is thought that these polymers can be utilized to prevent pitch deposition on all wetted surfaces from the pulp mill to the reel of the paper machine under a variety of pH's and conditions. More specifically, these compositions effectively decrease the deposition of metal soap and other resinous pitch components not only on metal surfaces, but also on plastic and synthetic surfaces such as machine wires, felts, foils, uhle boxes and headbox components. The compositions of this embodiment of the present invention can be added to the pulp at any stage of the paper making system. The compositions of this embodiment can be added in dry particulate form or as a dilute aqueous solution. The effective amount of these compositions to be added depends on the severity of the pitch problem which often depends on a number of variables, including the pH of the system.

For purposes of the present invention, controlling pitch present in fibers having pitch is understood as one or more of the following: reducing the size of pitch particles, reducing the number or amount of measurable particles present, and/or reducing the tackiness of the pitch. Preferably, when controlling pitch using the methods of the present invention, all of these reductions occur. Preferably, the reduction of the size of pitch particles is by at least about 5%, more preferably by from about 10% to about 75% as compared to when no ester hydrolyzing enzyme, water-soluble cellulose derivative, and lipoxygenase are present. Similarly, the reduction in the number or amount of pitch present in the fiber is reduced by at least about 5%, and more preferably by from about 10% to about 75% (e.g., by weight) when compared to fibers which have not been treated with the composition combining water-soluble cellulose derivatives, ester hydrolyzing enzyme, and lipoxygenase. Also, the reduction of tackiness of the pitch is preferably reduced by at least about 5%, and more preferably by from about 10% to about 75% when compared to fibers which have not been treated with the composition.

The present invention will be further clarified by the following examples, which are intended to be purely exemplary of the present invention, in which parts are proportions by weight unless otherwise specified.

EXAMPLES

Example 1

In the following tested samples, contaminant control in recycled paper was examined for compositions containing enzymes and water-soluble cellulose in various combinations, individually, or without either. In each of the following tested samples, a machine chest stock resulting from used hot melt glued, single wall corrugated containers was obtained from a mill and had approximately 3 to about 5% by weight consistency of fibers or solids. This stock was then diluted to a 1% by weight consistency the pH was adjusted to 7.4 and then heated to approximately 50 to 60° C. 1,000 milliliter samples of the dilute stock were then placed on a hot plate to maintain the 50 to 60° C. temperature and the dilute stock was mixed at a constant rate of approximately 100-150 rpm. Then, various combinations of different types of ester hydrolyzing enzymes and water-soluble cellulose were added to different portions of the furnish, and the resulting different samples were mixed for 1 to 2 hours. The compositions tested are identified as Samples 1-8 for purposes of this example and referenced figures. The ester hydrolyzing enzymes that were tested were a triacylglycerol lipase, abbreviated as enzyme "E1" for purposes herein, and an esterase source (Optimyze®, containing about 10% esterase obtained as Novozymes NS51032 from Novozymes Inc., with solvents and surfactant for stability), abbreviated as enzyme source "E2" for purposes herein. When used in a test sample, each of enzymes E1 and E2 were dosed at about 0.05 to about 0.5 lbs. of enzyme per ton of dry fiber. The water-soluble cellulose ingredient was hydroxypropylmethyl cellulose obtained as Methocell F50 (Dow Chemical Co., Midland Mich.), abbreviated as "HPMC" for purposes herein. When used, Methocell was dosed at about 0.01 to about 0.5 lbs. of Methocell per ton of dry fiber.

The enzyme(s) and water-soluble cellulose contained in each test sample was as follows:
Sample 1: E1;
Sample 2: Control (no enzyme or water-soluble cellulose);
Sample 3: E1, E2, HPMC;
Sample 4: E2;
Sample 5: E2, HPMC;
Sample 6: MC;
Sample 7: E1, HPMC;
Sample 8: E2, HPMC. For Sample 8, E2 and HPMC were added separately to the furnish.

For Sample 5, E2 and HPMC were pre-combined in the sample added to the furnish.

The samples were then diluted to 10 liters by introducing water and then these samples were screened through a Pulmac Masterscreen using a 0.004 inch screen. The contaminants collected on the filter pad were dried in an oven. A clean piece of black filter paper and unused calcium carbonate coated paper with the calcium carbonate in contact with the collection pad was placed on top of the collection pad and the pieces were then placed on a Carver Press and pressed for 3 minutes at 300° F. (135° C.) at a pressure of 10,000 psi. The top filter and the calcium carbonate coated paper was then peeled off and the amount of contaminants by counts and ppm were measured using an Optimax Flatbed Scanner. This same set-up was used to determine the "Counts" reported in FIG. 1. The contaminants were classified according to size as series 1, 2, and 3, in which series 1 was "small" stickies having a size of 0.02 to 0.10 $mm^2$, series 2 was intermediate or "medium" stickies having a size of 0.10 to 1.00 $mm^2$, and series 3 was "large" stickies having a size of 1.00 or more $mm^2$.

Figure 1:
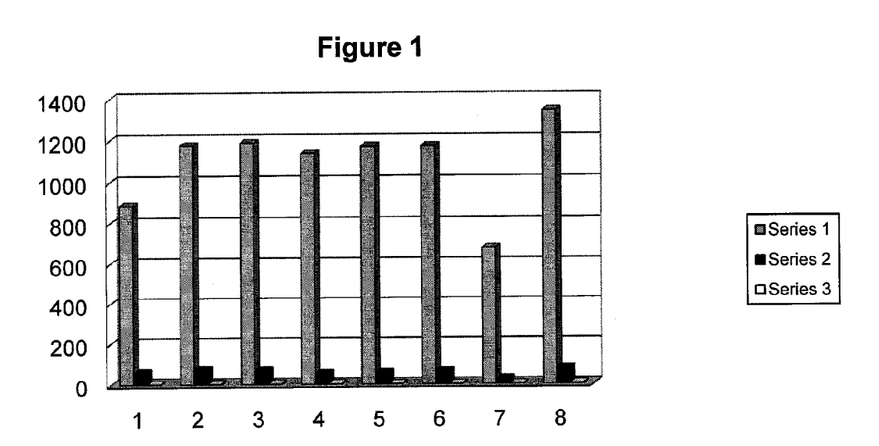
FIG. 1 is a bar graph depicting the reduction in organic contaminants, based on total count of organic contaminants at three size ranges thereof using a composition combining a water-soluble cellulose derivative and an ester hydrolyzing enzyme, in a recycled pulp furnish.
Figure 2:
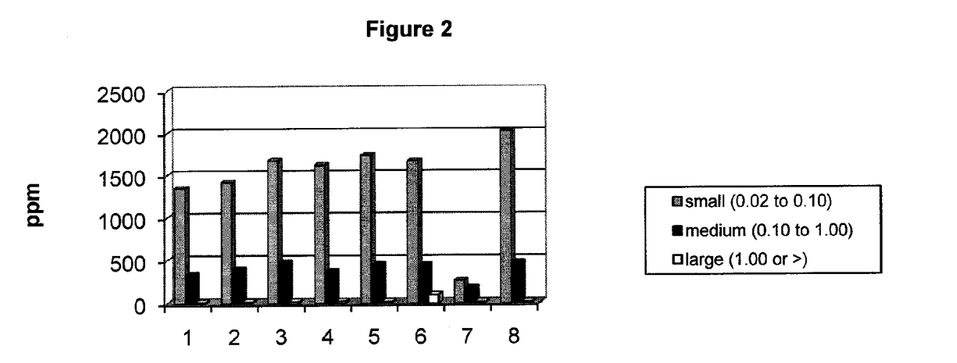
FIG. 2 is a bar graph depicting the reduction in organic contaminants, based on ppm organic contaminants at three size ranges thereof, using a composition combining a water-soluble cellulose derivative and an ester hydrolyzing enzyme, in a recycled pulp furnish.

The results are set forth in FIGS. 1-2 and are compared to a Control (Sample 2) wherein the same procedure as described above was followed except no enzyme nor water-soluble cellulose was added to the furnish. As can be seen, the amount of counts and ppm organic contaminants or "stickies" was significantly reduced when the combined ester hydrolyzing enzyme and water-soluble cellulose containing composition was used. No large stickies were observed for any samples other than the HPMC sample. However, with respect to the intermediate and small sized stickies, the combined ester hydrolyzing enzyme and water-soluble cellulose containing composition, and particularly lipase combined with water-soluble cellulose of Sample 7 (i.e., "E1+HPMC"), provided significant stickies reductions compared to the Control or the compounds used alone. Referring to FIG. 1, for example, Sample 7, representative of the present invention, reduced the count of organic contaminants by at least about 20% as compared to the enzyme alone (E1) of Sample 1 or water-soluble cellulose alone (HPMC) of Sample 6. Referring to FIG. 2, for example, Sample 7 representative of the present invention reduced the amount in ppm of organic contaminants by at least about 500% by weight as compared to the enzyme alone (E1) of Sample 1 or water-soluble cellulose alone (HPMC) of Sample 6. Thus, the present invention was quite effective in reducing the amount of organic contaminants in fibers containing such organic contaminants.

Example 2

Additional experiments were conducted using similar procedures to those described in Example 1 except three different types of water-soluble cellulose were included in these studies. In these additional experiments, Sample 9 was a control that contained neither enzyme nor water-soluble cellulose, Sample 10 contained enzyme source E2 but no water-soluble cellulose, Sample 11 contained enzyme source E2 and hydroxypropylmethyl cellulose HPMC, Sample 12 contained enzyme source E2 and hydroxyethyl methyl cellulose (HEC) obtained as Cellosize QP-1500-H hydroxyethyl cellulose from Dow Chemical Co., and Sample 13 contained enzyme source E2 and methylcellulose (MC) obtained as Methocel F15AV from Dow Chemical Co. Abbreviations used for materials in the previous example have the same meaning where present in this or subsequent examples.

Figure 3:
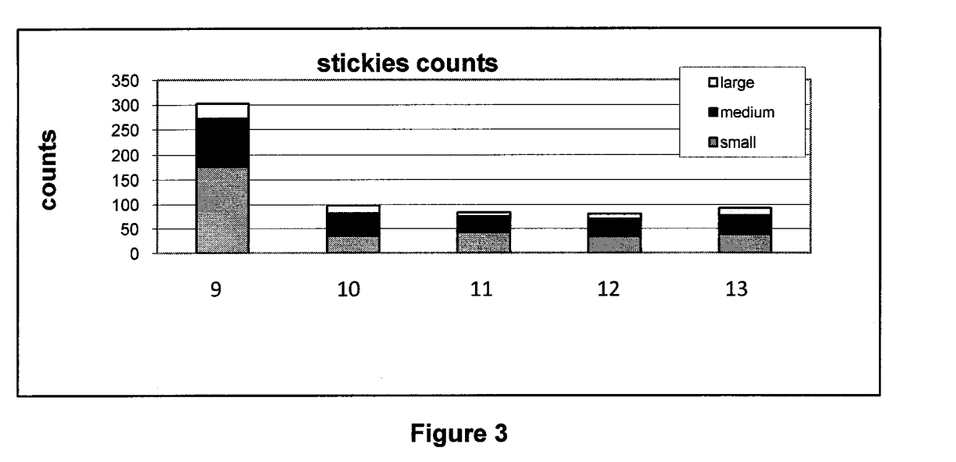
FIG. 3 is a bar graph depicting the reduction in organic contaminants, based on total count of organic contaminants at three size ranges thereof, using a composition combining one of several different water-soluble cellulose derivatives and an ester hydrolyzing enzyme, in a recycled pulp furnish.

The counts of the various sizes of stickies exhibited by Samples 9-13 are set forth in FIG. 3. As shown by the results in FIG. 3, Samples 11, 12, and 13 containing both an ester-hydrolyzing enzyme and any one of the three different water-soluble celluloses studied provided superior overall stickies control as compared to the control Sample 9 or Sample 10 containing only an enzyme.

Example 3

In the following tested samples, pitch control efficacy was examined for compositions containing enzymes and water-soluble cellulose in various combinations, individually, or without either. The procedure for testing enzymes and water-soluble cellulose for pitch control efficacy was as follows. 10 grams (dry basis) of thermomechanical (TMP) pulp (approx. 40% consistency) was weighed out, and diluted to one liter with hot water. Using a stirrer/hot plate, the temperature was set to 50° C. and the stirrer speed set at 150 RPM. The necessary amount of product was added as noted, and stirring was allowed for one hour. After one hour, some of the pulp slurry was filtered through #4 Whatman filter paper and the turbidity was run on a Hach 2100P Turbidity Meter and results were recorded as nephelometric turbidity units (NTUs). The product feed rates were calculated to deliver 2 pounds of product containing 2% enzyme (if included) and 6% water-soluble cellulose (if included). Although thermomechanical (TMP) pulp was used for purposes of these experiments, similar protocols may also be applied to a different virgin fiber source such as undried, virgin groundwood or bleached or unbleached Kraft or sulfite pulp.

Samples 14-21 were tested in these experiments. The product descriptions of these samples are as follows:
Sample 14: Control (no enzyme or water-soluble cellulose);
Sample 15: E2;
Sample 16: E2, HPMC;
Sample 17: E2, HEC;
Sample 18: E2, MC;
Sample 19: E2, B1 where B1 is a lipase source (Busperse® 2528, containing about 30% lipase obtained as Novozyme Resinase HT from Novozymes Inc., with solvents and surfactant for stability;
Sample 20: B1;
Sample 21: B1, HPMC.

Figure 4:
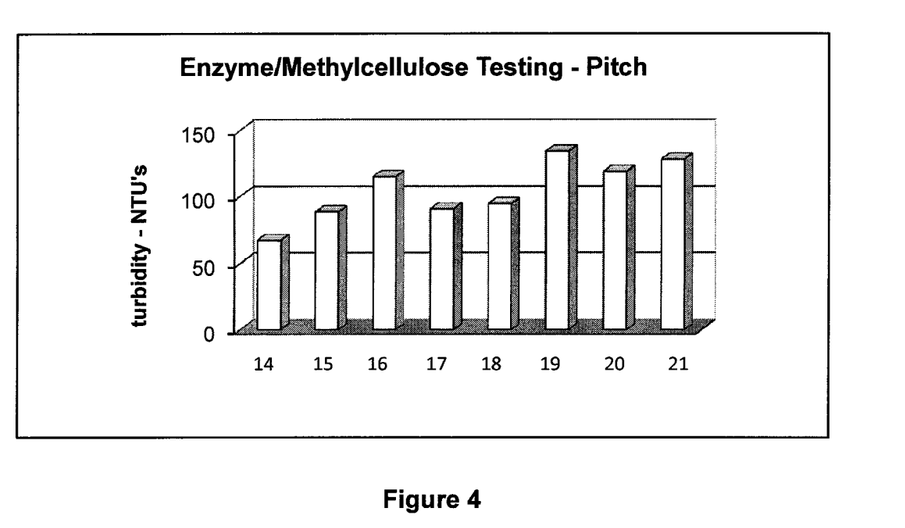
FIG. 4 is a bar graph depicting increased turbidity, expressed in NTU's, associated with an increase in dispersed organic contaminants removed from wood fiber of a 40% consistency thermomechanical pulp using a composition combining a water-soluble cellulose derivative and an ester hydrolyzing enzyme.

The turbidity results for Samples 14-21 are set forth in FIG. 4. For purposes of these results, higher turbidity is associated with an increase in dispersed organic contaminants removed from wood fiber surfaces in the 40% consistency thermomechanical pulp. As shown by the results in FIG. 4, Sample 21, in which the pulp was treated with a combination of lipase B1 and water-soluble cellulose HPMC, exhibited greater turbidity than Sample 20, in which the pulp was treated with lipase B1 alone, and the control Sample 14. Samples 16-18, in which pulps were treated with esterase E2 and one of the water-soluble celluloses HPMC, HEC, or MC, exhibited greater turbidity than Sample 15, in which the pulp was treated with esterase E2 alone, and the control Sample 14.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

It will be apparent to those skilled in the art that various modifications and variations can be made to the embodiments of the present invention without departing from the spirit or scope of the present invention. Thus, it is intended that the present invention covers other modifications and variations of this invention provided they come within the scope of the appended claims and their equivalents.

What is claimed is:

1. A method for controlling deposition of organic contaminants from fibers in paper making systems, comprising contacting said fibers with a composition comprising at least one water-soluble cellulose derivative and at least one ester hydrolyzing enzyme, for a sufficient time and in sufficient amount to control the organic contaminants present in the fibers.

2. The method of claim 1, wherein said organic contaminants comprise synthetic polymers from adhesives, glues, hot-melts, coatings, coating binders, de-inking chemicals, ink residues, wood resins, rosin, contact adhesive binders, unpulped wet strength resins, pitch, or combinations thereof.

3. The method of claim 1, wherein said fibers comprise recycled fibers.

4. The method of claim 3, wherein said organic contaminants comprise stickies.

5. The method of claim 3, wherein the ester hydrolyzing enzyme comprises lipase.

6. The method of claim 3, wherein the water-soluble cellulose derivative is methyl cellulose, hydroxyl methyl cellulose, hydroxyethyl methyl cellulose, hydropropyl methyl cellulose, cetyl hydroxyethylcellulose or hydroxybutyl methyl cellulose, singly or in any combination thereof.

7. The method of claim 3, wherein said fibers containing organic contaminants comprise fibers from old corrugated containers, old newsprint or old newspapers, mixed office waste, or any combinations thereof.

8. The method of claim 3, wherein the organic contaminants are at least controlled by reducing the amount of organic contaminants present in the fiber.

9. The method of claim 3, wherein the organic contaminants are at least controlled by reducing the size of the organic contaminants present in the fibers.

10. The method of claim 3, wherein the organic contaminants are at least controlled by reducing the tackiness of the organic contaminants present in the fibers.

11. The method of claim 3, wherein said composition is introduced prior to a pulping stage.

12. The method of claim 3, wherein said composition is introduced during a pulping stage.

13. The method of claim 3, wherein said composition is introduced during or right before a stock preparation stage.

14. The method of claim 3, wherein said composition is introduced after a flotation or a de-inking stage.

15. The method of claim 3, wherein said composition is introduced in an amount providing about 0.002 to about 2 lbs. water-soluble cellulose derivative per ton of dry fiber, and about 0.005 to about 4 lbs. ester hydrolyzing enzyme per ton dry fiber treated.

16. The method of claim 3, wherein said composition is in contact with the fibers for a time of from about 1 minute to about 8 hours.

17. The method of claim 3, further comprising forming said fibers into paper or paperboard products.

18. The method of claim 3, wherein said composition is introduced prior to the paper machine headbox.

19. The method of claim 3, wherein said composition is introduced in the paper machine white water.

20. The method of claim 1, wherein said fibers comprises virgin fibers, said organic contaminants comprise pitch.

21. The method of claim 20, wherein said composition further comprises lipoxygenase.

22. The method of claim 20, wherein the ester hydrolyzing enzyme comprises esterase, lipase, or cutinase, singly or in any combination thereof.

23. The method of claim 20, wherein the water-soluble cellulose derivative is methyl cellulose, hydroxyl methyl cellulose, hydroxyethyl methyl cellulose, hydropropyl methyl cellulose, cetyl hydroxyethylcellulose, or hydroxybutyl methyl cellulose, singly or in any combination thereof.

24. The method of claim 21, wherein said composition is introduced in an amount providing about 0.002 to about 2 lbs. water-soluble cellulose derivative per ton of dry fiber treated, and about 0.005 to about 4 lbs. ester hydrolyzing enzyme per ton dry fiber treated, and about 0.004 to about 4 lbs. lipoxygenase per ton of dry fiber treated.

25. The method of claim 1, wherein said water-soluble cellulose derivative is a methyl ether cellulose derivative.

26. The method of claim 1, wherein the ester hydrolyzing enzyme comprises esterase, lipase, or cutinase, singly or in any combination thereof.

* * * * *

UNITED STATES PATENT AND TRADEMARK OFFICE
CERTIFICATE OF CORRECTION

PATENT NO. : 7,862,688 B2  
APPLICATION NO. : 12/119692  
DATED : January 4, 2011  
INVENTOR(S) : George S. Thomas Page 1 of 1

It is certified that error appears in the above-identified patent and that said Letters Patent is hereby corrected as shown below:

IN THE CLAIMS:

Claim 6, column 16, line 3, "hydropropyl" should read --hydroxypropyl--.

Claim 23, column 16, line 51, "hydropropyl" should read --hydroxypropyl--.

Signed and Sealed this
Twenty-second Day of February, 2011

David J. Kappos
*Director of the United States Patent and Trademark Office*